United States Patent
Li et al.

(10) Patent No.: US 9,070,406 B1
(45) Date of Patent: Jun. 30, 2015

(54) DISK DRIVE CONFIGURING ONE-DIMENSIONAL AND TWO-DIMENSIONAL RECORDING AREAS BASED ON READ ELEMENT SPACING

(71) Applicant: Western Digital Technologies, Inc., Irvine, CA (US)

(72) Inventors: Shaoping Li, San Ramon, CA (US); Gerardo A. Bertero, Redwood City, CA (US); Donald Brunnett, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/304,347

(22) Filed: Jun. 13, 2014

Related U.S. Application Data

(63) Continuation-in-part of application No. 14/203,358, filed on Mar. 10, 2014.

(51) Int. Cl.
*G11B 5/02* (2006.01)
*G11B 20/10* (2006.01)

(52) U.S. Cl.
CPC .............................. *G11B 20/10268* (2013.01)

(58) Field of Classification Search
None
See application file for complete search history.

(56) References Cited

U.S. PATENT DOCUMENTS

| | | | |
|---|---|---|---|
| 3,780,266 A | 12/1973 | Mudsam et al. | |
| 4,007,493 A | 2/1977 | Behr et al. | |
| 4,012,781 A | 3/1977 | Lin | |
| 4,152,736 A | 5/1979 | Jansen et al. | |
| 4,589,038 A | 5/1986 | Radtke | |
| 4,597,023 A | 6/1986 | Rijckaert | |
| 4,729,048 A | 3/1988 | Imakoshi et al. | |
| 4,903,151 A | 2/1990 | Mizukami et al. | |
| 5,010,430 A | 4/1991 | Yamada et al. | |
| 5,229,901 A | 7/1993 | Mallary | |
| 5,270,892 A | 12/1993 | Naberhuis | |
| 5,309,305 A | 5/1994 | Nepela et al. | |
| 5,321,557 A | 6/1994 | Shimotashiro et al. | |
| 5,353,176 A | 10/1994 | Kosuge | |
| 5,388,014 A | 2/1995 | Brug et al. | |
| 5,508,868 A | 4/1996 | Cheng et al. | |
| 5,523,904 A | 6/1996 | Saliba | |
| 5,684,658 A | 11/1997 | Shi et al. | |
| 5,696,654 A | 12/1997 | Gill et al. | |

(Continued)

OTHER PUBLICATIONS

Shaoping Li, et al. U.S. Appl. No. 61/892,336, filed Oct. 17, 2013, 38 pages.

(Continued)

*Primary Examiner* — Paul Huber

(57) ABSTRACT

A disk drive is disclosed comprising a disk comprising a plurality of tracks, and a head comprising a first read element and a second read element. A spacing of the first and second read elements is measured, and based on the measured spacing, the tracks are grouped into radial bands that define at least one one-dimensional recording area on the disk and at least one two-dimensional recording area on the disk. When the head is within a first two-dimensional recording area, data recorded on the disk is detected by processing a first read signal generated by the first read element and by processing a second read signal generated by the second read element using a two-dimensional demodulation algorithm. When the head is within a first one-dimensional recording area, data recorded on the disk is detected by processing the first read signal using a one-dimensional demodulation algorithm.

16 Claims, 11 Drawing Sheets

(56) References Cited

U.S. PATENT DOCUMENTS

| | | |
|---|---|---|
| 5,721,008 A | 2/1998 | Huang et al. |
| 5,796,535 A | 8/1998 | Tuttle et al. |
| 5,831,888 A | 11/1998 | Glover |
| 5,912,779 A | 6/1999 | Llewellyn et al. |
| 5,963,400 A | 10/1999 | Cates et al. |
| 6,018,789 A | 1/2000 | Sokolov et al. |
| 6,021,024 A | 2/2000 | Akiyama et al. |
| 6,065,095 A | 5/2000 | Sokolov et al. |
| 6,071,007 A | 6/2000 | Schaenzer et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,104,562 A | 8/2000 | Ottesen et al. |
| 6,105,104 A | 8/2000 | Guttmann et al. |
| 6,111,717 A | 8/2000 | Cloke et al. |
| 6,145,052 A | 11/2000 | Howe et al. |
| 6,154,335 A | 11/2000 | Smith et al. |
| 6,157,510 A | 12/2000 | Schreck et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,191,925 B1 | 2/2001 | Watson |
| 6,195,218 B1 | 2/2001 | Guttmann et al. |
| 6,205,494 B1 | 3/2001 | Williams |
| 6,208,477 B1 | 3/2001 | Cloke et al. |
| 6,216,242 B1 | 4/2001 | Schaenzer |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,271,998 B1 | 8/2001 | Coehoorn et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,311,551 B1 | 11/2001 | Boutaghou |
| 6,317,850 B1 | 11/2001 | Rothberg |
| 6,327,106 B1 | 12/2001 | Rothberg |
| 6,337,778 B1 | 1/2002 | Gagne |
| 6,341,102 B1 | 1/2002 | Sato et al. |
| 6,369,969 B1 | 4/2002 | Christiansen et al. |
| 6,369,982 B2 | 4/2002 | Saliba |
| 6,373,648 B2 | 4/2002 | O'Connor |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,131 B2 | 9/2002 | Guo et al. |
| 6,449,767 B1 | 9/2002 | Krapf et al. |
| 6,453,115 B1 | 9/2002 | Boyle |
| 6,462,541 B1 | 10/2002 | Wang et al. |
| 6,469,878 B1 | 10/2002 | Mack et al. |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,496,333 B1 | 12/2002 | Han et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,674,618 B2 | 1/2004 | Engel et al. |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,842,312 B1 | 1/2005 | Alstrin et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |

(56) References Cited

U.S. PATENT DOCUMENTS

| | | |
|---|---|---|
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,921,592 B2 | 7/2005 | Tani et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,947,247 B2 | 9/2005 | Schwarz et al. |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,987,408 B2 | 1/2006 | Kim |
| 6,995,933 B1 | 2/2006 | Codilian et al. |
| 6,996,501 B1 | 2/2006 | Rothberg |
| 6,996,669 B1 | 2/2006 | Dang et al. |
| 7,002,777 B2 | 2/2006 | Ogawa et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,549 B2 | 9/2006 | Asakura |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,193,807 B1 | 3/2007 | Liikanen et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,514 B1 | 5/2007 | Yang et al. |
| 7,215,771 B1 | 5/2007 | Hamlin |
| 7,237,054 B1 | 6/2007 | Cain et al. |
| 7,239,465 B1 | 7/2007 | Watson et al. |
| 7,240,161 B1 | 7/2007 | Boyle |
| 7,242,547 B2 | 7/2007 | Ogawa |
| 7,249,365 B1 | 7/2007 | Price et al. |
| 7,259,927 B2 | 8/2007 | Harris |
| 7,263,709 B1 | 8/2007 | Krapf |
| 7,271,970 B2 | 9/2007 | Tsuchiya |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,324,303 B2 | 1/2008 | Ozue et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,382,585 B1 | 6/2008 | Nibarger et al. |
| 7,392,340 B1 | 6/2008 | Dang et al. |
| 7,404,013 B1 | 7/2008 | Masiewicz |
| 7,405,907 B2 | 7/2008 | Raastad |
| 7,406,545 B1 | 7/2008 | Rothberg et al. |
| 7,408,730 B2 | 8/2008 | Yamagishi |
| 7,415,571 B1 | 8/2008 | Hanan |
| 7,420,758 B2 | 9/2008 | Inoue et al. |
| 7,436,610 B1 | 10/2008 | Thelin |
| 7,436,632 B2 | 10/2008 | Li et al. |
| 7,437,502 B1 | 10/2008 | Coker |
| 7,440,214 B1 | 10/2008 | Ell et al. |
| 7,451,344 B1 | 11/2008 | Rothberg |
| 7,453,671 B1 | 11/2008 | Nibarger et al. |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,502,193 B2 | 3/2009 | Albrecht et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,551,393 B2 | 6/2009 | Biskeborn et al. |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,602,193 B1 | 10/2009 | Baird et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,652,847 B2 | 1/2010 | Weiss et al. |
| 7,653,927 B1 | 1/2010 | Kapner, III et al. |
| 7,656,603 B1 | 2/2010 | Xing |
| 7,656,610 B1 | 2/2010 | Campos et al. |

(56) References Cited

U.S. PATENT DOCUMENTS

| | | |
|---|---|---|
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,751,148 B1 | 7/2010 | Alstrin et al. |
| 7,755,863 B2 | 7/2010 | Neumann et al. |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,009,388 B2 | 8/2011 | Oh et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,144,424 B2 | 3/2012 | Dugas et al. |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,208,228 B2 | 6/2012 | Maat et al. |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,508,880 B2 | 8/2013 | Gao et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,508 B1 | 12/2013 | Burd |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |

(56) References Cited

U.S. PATENT DOCUMENTS

| | | |
|---|---|---|
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,517 B2 | 4/2014 | Erden et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,786,987 B2 | 7/2014 | Edelman et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2003/0002190 A1* | 1/2003 | Teo et al. .................. 360/63 |
| 2003/0026036 A1* | 2/2003 | Chew .................. 360/77.08 |
| 2003/0151855 A1 | 8/2003 | Molstad et al. |
| 2004/0184181 A1 | 9/2004 | Fukuda et al. |
| 2005/0036241 A1 | 2/2005 | Tsuda et al. |
| 2005/0036437 A1 | 2/2005 | Learned et al. |
| 2006/0007585 A1* | 1/2006 | Ehrlich et al. .................. 360/75 |
| 2007/0242378 A1 | 10/2007 | Ikegami et al. |
| 2009/0113702 A1 | 5/2009 | Hogg |
| 2010/0020435 A1 | 1/2010 | Chen et al. |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0223199 A1 | 8/2013 | Lund et al. |
| 2013/0242428 A1 | 9/2013 | Tetzlaff et al. |
| 2013/0250447 A1 | 9/2013 | Erden |
| 2013/0286502 A1 | 10/2013 | Erden et al. |
| 2014/0160590 A1 | 6/2014 | Sankaranarayanan et al. |

OTHER PUBLICATIONS

Michael L. Mallary, et al. U.S. Appl. No. 61/890,122, filed Oct. 11, 2013, 38 pages.
Donald Brunnett, et al. U.S. Appl. No. 61/909,905, filed Nov. 27, 2013, 27 pages.
Shaoping Li, et. al., U.S. Appl. No. 13/963,172, filed Aug. 8, 2013, 37 pages.
Paul E. Soderbloom, et. al., U.S. Appl. No. 14/264,244, filed Apr. 29, 2014, 24 pages.
Yiming Chen, et. al., U.S. Appl. No. 13/968,323, filed Aug. 15, 2013, 19 pages.
Donald Brunnett, et. al., U.S. Appl. No. 14/203,358, filed Mar. 10, 2014, 30 pages.
Donald Brunnett, et. al., Office Action dated: Jul. 31, 2014 for U.S. Appl. No. 14/203,358, filed Mar. 10, 2014, 64 pages.
Office Action dated Jan. 26, 2015 from U.S. Appl. No. 14/203,358, 39 pgs.
Donald Brunnett, et al., U.S. Appl. No. 14/325,643, Filed Jul. 8, 2014, 27 pgs.
Shaoping Li, et al., U.S. Appl. No. 14/097,157, filed Dec. 4, 2013, 38 pgs.
Shaoping Li, et al., U.S. Appl. No. 13/928,799, filed Jun. 27, 2013, 27 pgs.
Michael L. Mallory, et al., U.S. Appl. No. 14/099,849, filed Dec. 6, 2013, 15 pgs.

* cited by examiner

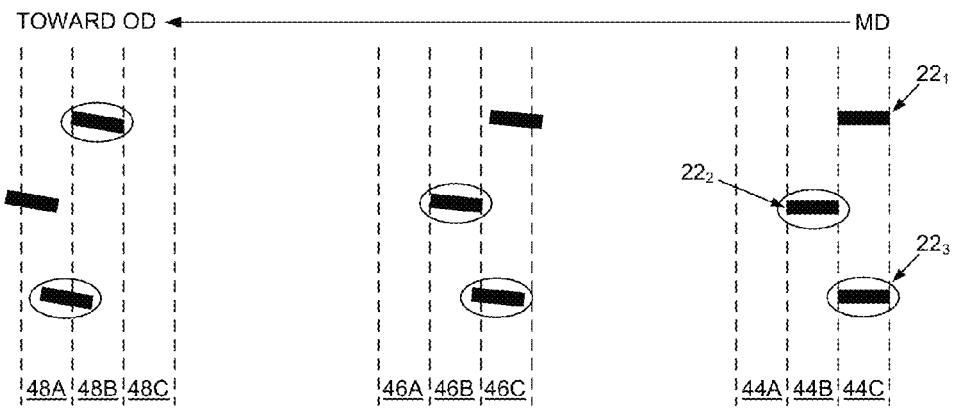
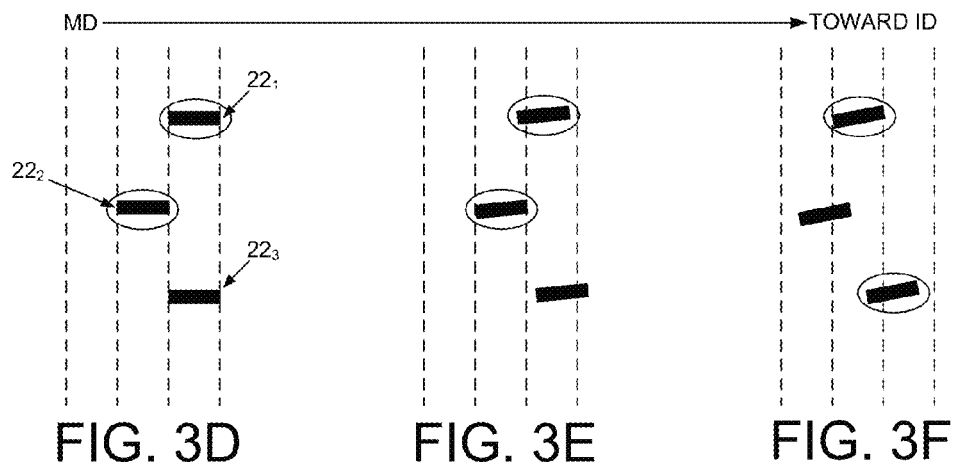

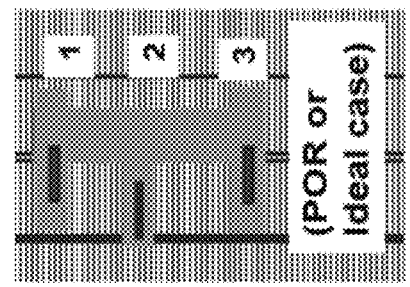
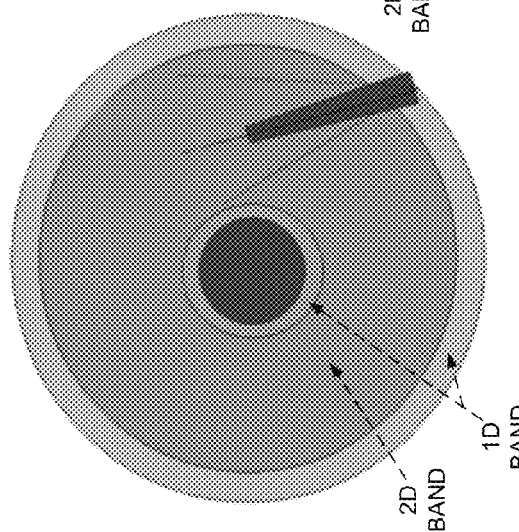
FIG. 10C
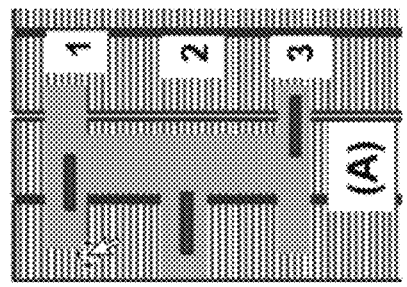
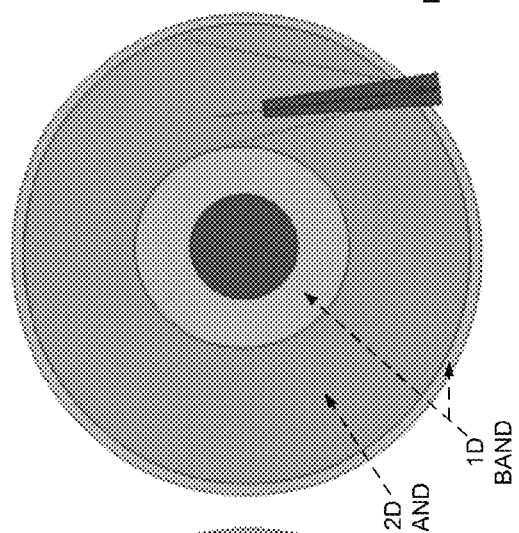
FIG. 10B
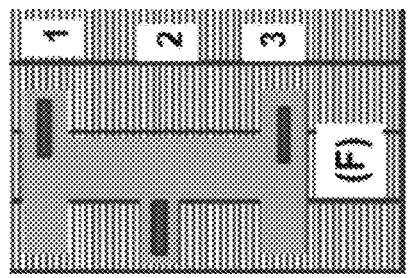
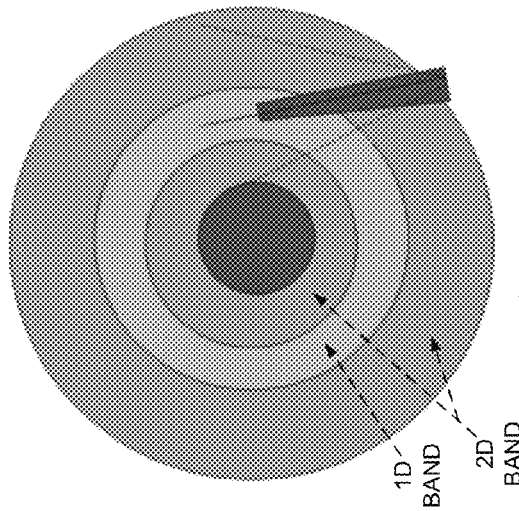
FIG. 10A

DISK DRIVE CONFIGURING ONE-DIMENSIONAL AND TWO-DIMENSIONAL RECORDING AREAS BASED ON READ ELEMENT SPACING

CROSS-REFERENCE TO RELATED APPLICATION(S)

This application is a continuation-in-part of co-pending U.S. patent application Ser. No. 14/203,358, filed on Mar. 10, 2014, the disclosure of which is incorporated herein by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

When reading data from the disk, a read channel typically samples the read signal to generate read signal samples that are equalized according to a target response (e.g., a partial response). A sequence detector (e.g., a Viterbi detector) detects an estimated data sequence from the equalized samples, and errors in the estimated data sequence are corrected, for example, using a Reed-Solomon error correction code (ECC) or using a Low Density Parity Check (LDPC) code.

BRIEF DESCRIPTION OF THE DRAWINGS

FIGS. 3A-3C show an embodiment wherein the second and third read elements are used to read data from the disk as the head moves from the middle diameter toward the outer diameter of the disk, and then the first and third read elements are used when the skew angle of the head exceeds a threshold relative to the track pitch of the data tracks.

FIGS. 3D-3F show an embodiment wherein the first and second read elements are used to read data from the disk as the head moves from the middle diameter toward the inner diameter of the disk, and then the first and third read elements are used when the skew angle of the head exceeds a threshold relative to the track pitch of the data tracks.

FIGS. 10A-10C show an embodiment wherein the tracks on the disk are grouped into one-dimensional and two-dimensional radial bands based on the measured spacing between the read elements.

DETAILED DESCRIPTION

Figure 11A:
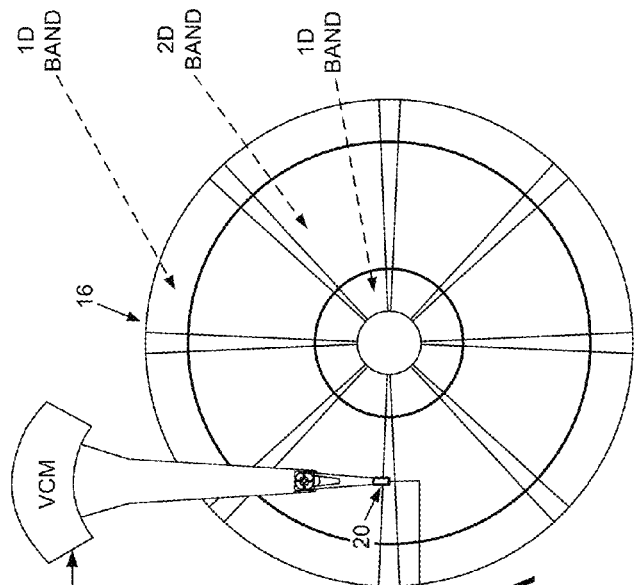
FIG. 11A shows a disk drive according to an embodiment comprising a head actuated over a disk comprising a plurality of tracks.
Figure 11B:
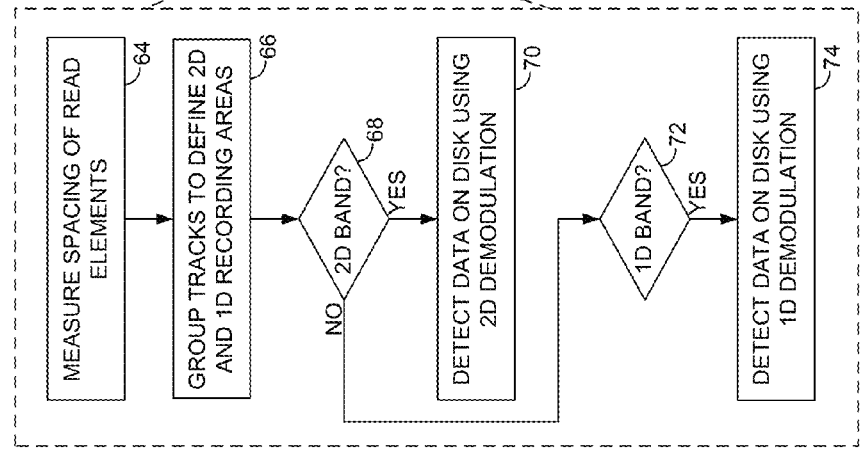
FIG. 11B is a flow diagram according to an embodiment wherein the spacing of the read element is measured and used to group the tracks into one-dimensional and two-dimensional radial bands.

FIG. 11A shows a disk drive according to an embodiment comprising a disk 16 comprising a plurality of tracks, and a head 20 comprising at least two read elements including a first read element and a second read element. The disk drive further comprises control circuitry 24 configured to execute the flow diagram of FIG. 11B, wherein a spacing of the first and second read elements is measured (block 64), and based on the measured spacing, the tracks are grouped into radial bands that define at least one one-dimensional recording area on the disk and at least one two-dimensional recording area on the disk (block 66). When the head is within a first two-dimensional recording area (block 68), data recorded on the disk is detected by processing a first read signal generated by the first read element and by processing a second read signal generated by the second read element using a two-dimensional demodulation algorithm (block 70). When the head is within a first one-dimensional recording area (block 72), data recorded on the disk is detected by processing the first read signal using a one-dimensional demodulation algorithm (block 74).

Figure 1:
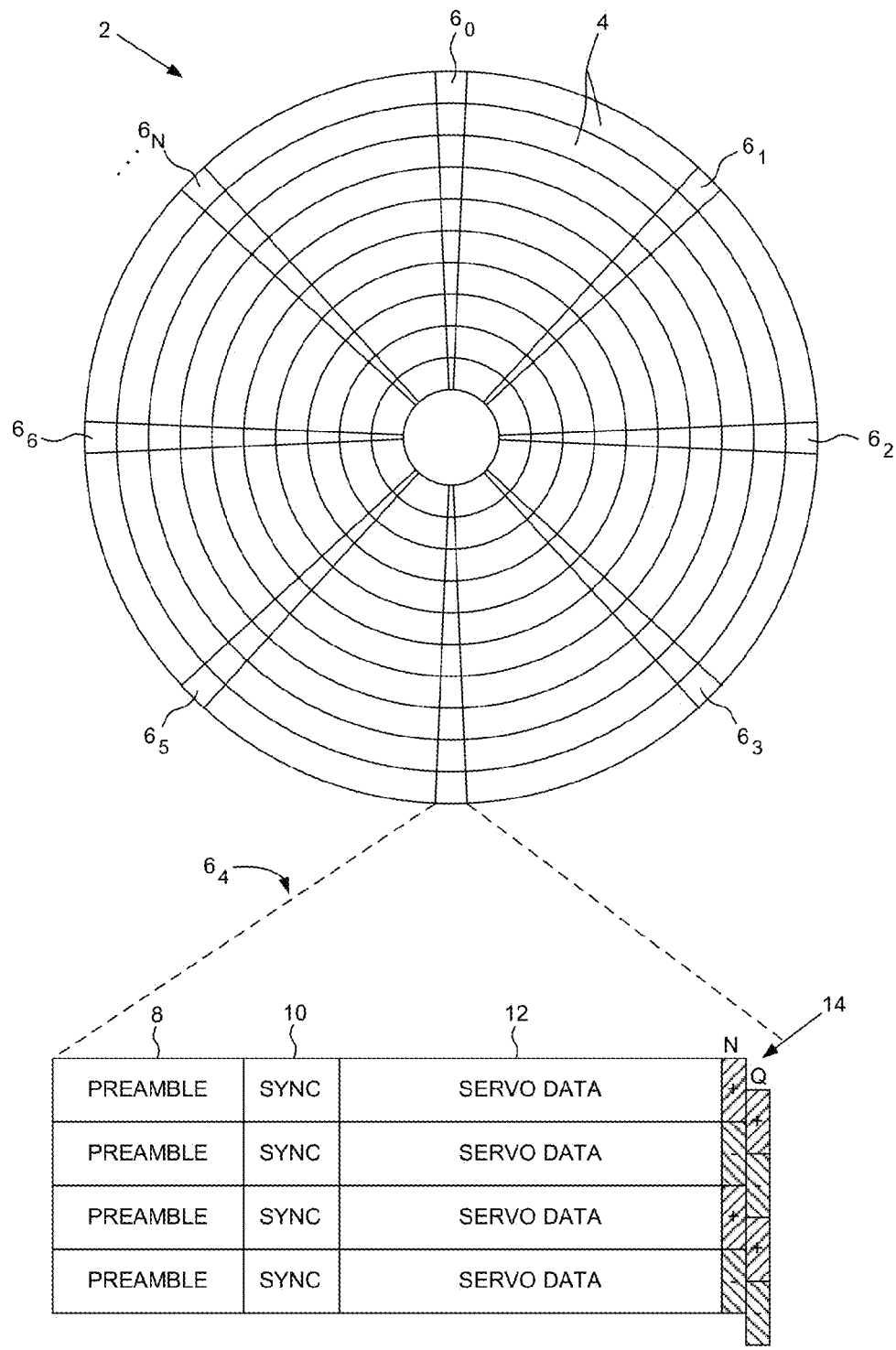
FIG. 1 shows a prior art disk format comprising a plurality of servo tracks defined by servo sectors.
Figure 2A:
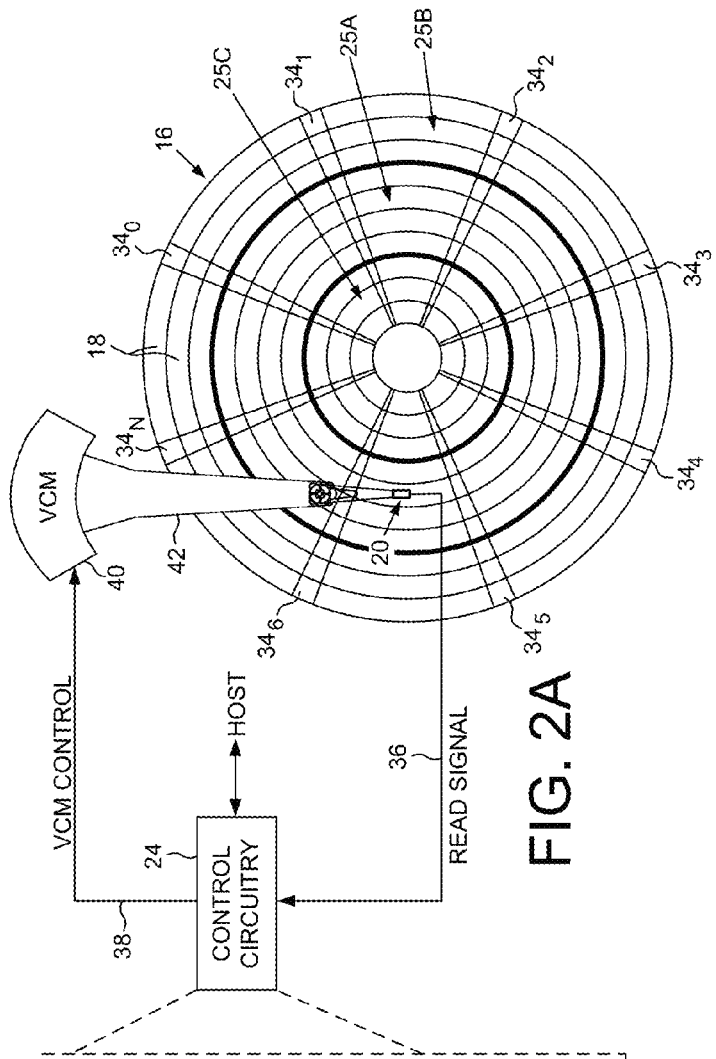
FIG. 2A shows a disk drive according to an embodiment comprising a disk having a plurality of tracks, and a head comprising at least three read elements including a first read element, a second read element, and a third read element.
Figure 2B:
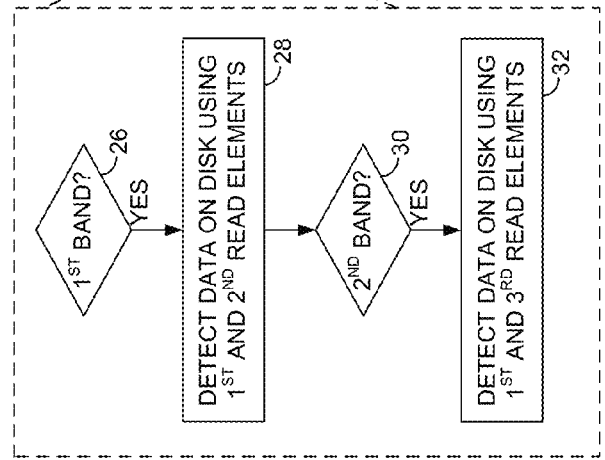
FIG. 2B is a flow diagram according to an embodiment wherein when the head is within a first radial band of the disk, data recorded on the disk is detected using the first read element and the second read element, and when the head is within a second radial band of the disk, data recorded on the disk is detected using the first read element and the third read element.
Figure 2C:
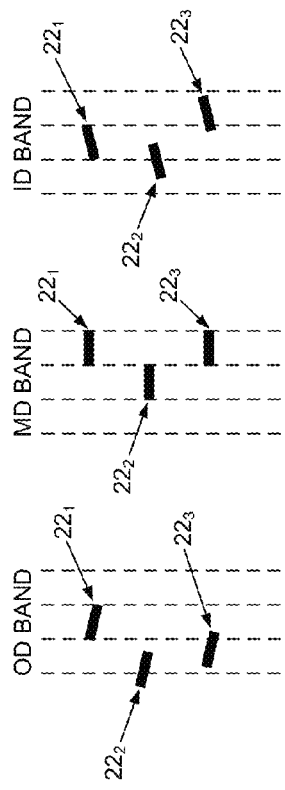
FIG. 2C shows an embodiment wherein two of the three heads are used to read data from the disk depending on the skew angle of the head.

FIG. 2A shows a disk drive according to an embodiment comprising a disk 16 comprising a plurality of tracks 18, and a head 20 comprising at least three read elements including a first read element $22_1$, a second read element $22_2$, and a third read element $22_3$ (FIG. 2C). The disk drive further comprises control circuitry 24 configured to execute the flow diagram of FIG. 2B, wherein when the head is within a first radial band 25A of the disk (block 26), data recorded on the disk is detected using the first read element and the second read element (block 28). When the head is within a second radial band 25B of the disk different from the first radial band (block 30), data recorded on the disk is detected using the first read element and the third read element (block 32). As shown in FIG. 2C, in one embodiment the first read element $22_1$ is substantially aligned down-track with the third read element $22_3$ when the head 20 is over a first radial location of the disk 16 (e.g., near the middle diameter of the disk 16). In another embodiment, the control circuitry 24 selects two of the three read elements $22_1$-$22_3$ to detect user data recorded on the disk based on the radial location of the head (e.g., the radial band), while the unselected read element is not used to read the user data.

In the embodiment of FIG. 2A, a plurality of concentric servo tracks are defined by embedded servo sectors $34_0$-$34_N$, wherein a plurality of concentric data tracks 18 are defined relative to the servo tracks at the same or different radial density. The control circuitry 24 processes a read signal 36 emanating from at least one of the read elements to demodulate the servo sectors and generate a position error signal (PES) representing an error between the actual position of the head and a target position relative to a target track. The control circuitry 24 filters the PES using a suitable compensation filter to generate a control signal 38 applied to a voice coil motor (VCM) 40 which rotates an actuator arm 42 about a pivot in order to actuate the head 20 radially over the disk 16 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the read signal generated by at least two of the read elements are processed to detect data recorded in a target data track using a two-dimensional demodulation algorithm meaning that the inter-track interference (ITI) caused by at least one adjacent data track is compensated in order to detect the data recorded in the target data track. FIG. 3A illustrates an example of this embodiment wherein when the head 20 is at the middle diameter of the disk 16, the read signal generated by the second read element $22_2$ and the read signal generated by the third read element $22_3$ are processed to detect data recorded in the target data track 44B. That is, when detecting the data recorded in the target data track 44B, the ITI caused by the adjacent data track 44C is compensated by processing the read signal generated by the third read element $22_3$. The ITI compensation may be implemented in any suitable manner, such as by subtracting the read signal generated by the third read element $22_3$ from the read signal generated by the second read element $22_2$ in the analog or digital domain. In another embodiment, the control circuitry 24 may employ two-dimensional digital equalization followed by a suitable two-dimensional sequence detector (e.g., a trellis type sequence detector such as a Viterbi detector). In another embodiment, the control circuitry 24 may employ two-dimensional (2D) to one-dimensional (1D) or 2D-to-1D digital equalization followed by a suitable one-dimensional sequence detector. In still another embodiment, the control circuitry 24 may process the read signal generated by the third read element $22_3$ to detect a data sequence recorded in the adjacent data track 44C, convert the detected data sequence into ideal signal samples, and then subtract the ideal signal samples from the equalized signal samples of the read signal generated by the second read element $22_2$. The resulting compensated signal samples may then be processed using a suitable one-dimensional sequence detector. Although in the embodiment of FIG. 3A the second read element $22_2$ does not overlap the third read element $22_3$ when the head 20 is near the middle diameter of the disk, in another embodiment the read elements may be fabricated so there is a small amount of overlap which may improve the ITI compensation near the middle diameter of the disk.

Referring to FIG. 3B, as the head 20 moves toward the outer diameter of the disk 16, the skew angle of the head causes the third read element $22_3$ to overlap with the target data track 46B over which the second read element $22_2$ is positioned. That is, part of the third read element $22_3$ is over the target data track 46B, and part of the third read element $22_3$ is over the adjacent data track 46C. At this skew angle, the data recorded in the target data track may still be detected by processing the read signal generated by the second and third read elements $22_2$ and $22_3$. As the head 20 moves further toward the outer diameter of the disk 16 as illustrated in FIG. 3C, the overlap of the second and third read elements $22_2$ and $22_3$ becomes excessive. That is, there is a point (e.g., up to one-quarter of a data track) where using the third read element to compensate for ITI for the second read element begins to degrade due to an excessive overlap of the read elements within the target data track. Accordingly, in one embodiment when the head skew exceeds a threshold (i.e., when the head 20 is within a second radial band 25B of the disk 16 as shown in FIG. 2A), data recorded on the disk 16 is detected using the first read element $22_1$ and the third read element $22_3$ as shown in FIG. 3C. That is, the first read element $22_1$ is positioned over the target data track 48B and the third read element $22_3$ is positioned over an adjacent data track 48A such that the third read element $22_3$ is used to compensate for ITI when detecting the data recorded in the target data track 48B. In an alternative embodiment, the third read element $22_3$ may be positioned over the target data track 48B and the first read element $22_1$ used to compensate for ITI from the adjacent data track 48C. That is, the ITI may be compensated from the adjacent data track on either side of the target data track, and in one embodiment a retry operation may attempt to compensate for the ITI from each of the adjacent data tracks as well as from both of the adjacent data tracks (e.g., by buffering data during an initial revolution of the disk).

FIGS. 3D-3F illustrate a similar toggling between read elements as the head moves from the middle diameter toward the inner diameter of the disk (i.e., when the head skew is reversed). In this embodiment, the read signals from the first and second read elements $22_1$ and $22_2$ are processed to detect data recorded in the target data track when the head is in the first band 25A of FIG. 2A as shown in FIGS. 3D and 3E, and then when the head transitions into the third band 25C toward the inner diameter of the disk as shown in FIG. 3F, the read signals from the first and third read elements $22_1$ and $22_3$ are processed to detect data recorded in the target data track.

In one embodiment, the control circuitry 24 may detect data recorded in a first data track and in a second data track. Referring again to the example embodiment shown in FIG. 3A, the control circuitry 24 may process the read signals from the second read element $22_2$ and from the third read element $22_3$ to detect data in both data track 44B and data track 44C. The control circuitry 24 may process the read signals to detect the data from either data track using a one-dimensional or two-dimensional algorithm. For example, in one embodiment the data may be detected in both data tracks using a two-dimensional demodulation algorithm wherein the ITI from each of the adjacent data tracks is compensated. In another embodiment, the data may be detected in one of the data tracks using a one-dimensional demodulation algorithm, whereas the data recorded in the other data track may be detected using a two-dimensional demodulation algorithm.

Figure 4A:
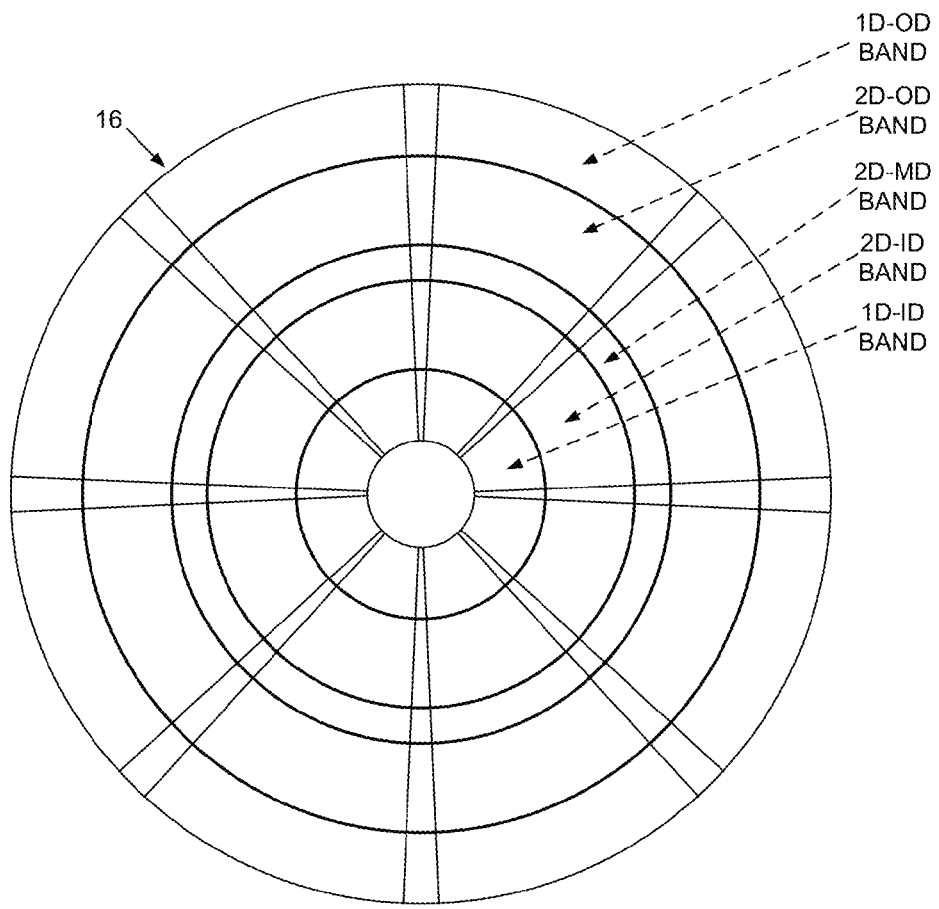
FIGS. 4A and 4B show an embodiment wherein data recorded on the disk is detected using a single head and a one-dimensional demodulation algorithm at the outer and inner diameter radial bands, and data is detected using two of the heads and a two-dimensional demodulation algorithm at the inner diameter radial bands.
Figure 4B:
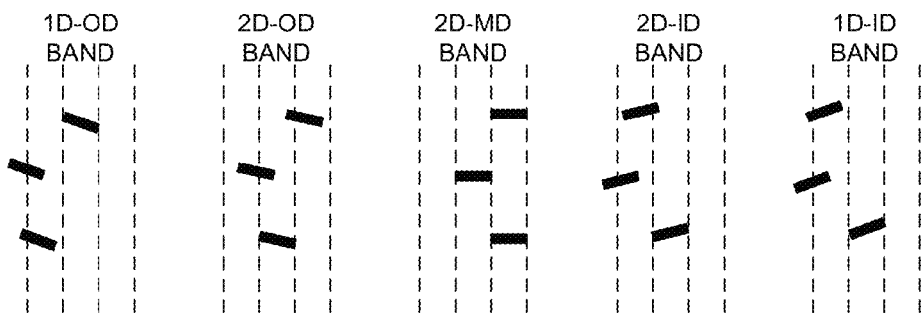

FIGS. 4A and 4B show an embodiment wherein when the skew angle of the head 20 exceeds a threshold toward the outer diameter and inner diameter of the disk, there may be insufficient overlap of a target data track by the first and third read elements $22_1$ and $22_3$. Accordingly, the disk 16 may comprise an outer diameter radial band of data tracks and an inner diameter radial band of data tracks where only one of the read elements is used to detect data recorded in a target data track. In the embodiment of FIG. 4B, the read signal generated by the first read element $22_1$ is processed to detect data recorded in a target data track when the head 20 is in the outer most diameter band of data tracks (1D-OD BAND), and the read signal generated by the third read element $22_3$ is processed to detect data recorded in a target data track when the head 20 is in the inner most diameter band of data tracks (1D-ID BAND). However, any one of the read elements be used to read data in the 1D-OD BAND and the 1D-ID band, including the second read element When the head is within one of the 1D-OD BAND or the 1D-ID BAND, the data recorded in a target data track is detected by processing the read signal using a one-dimensional demodulation algorithm meaning that the ITI from an adjacent data track is not compensated. When the head is within one of the 2D-OD BAND, the 2D-MD BAND, or the 2D-ID BAND, the data recorded in a target data track is detected by processing the first and second read signals using a two-dimensional demodulation algorithm. In one embodiment, the linear and/or the radial recording density of the data tracks in the 2D bands may be increased due to the improved accuracy of a two-dimensional demodulation algorithm as compared to a one-dimensional demodulation algorithm.

Figure 5:
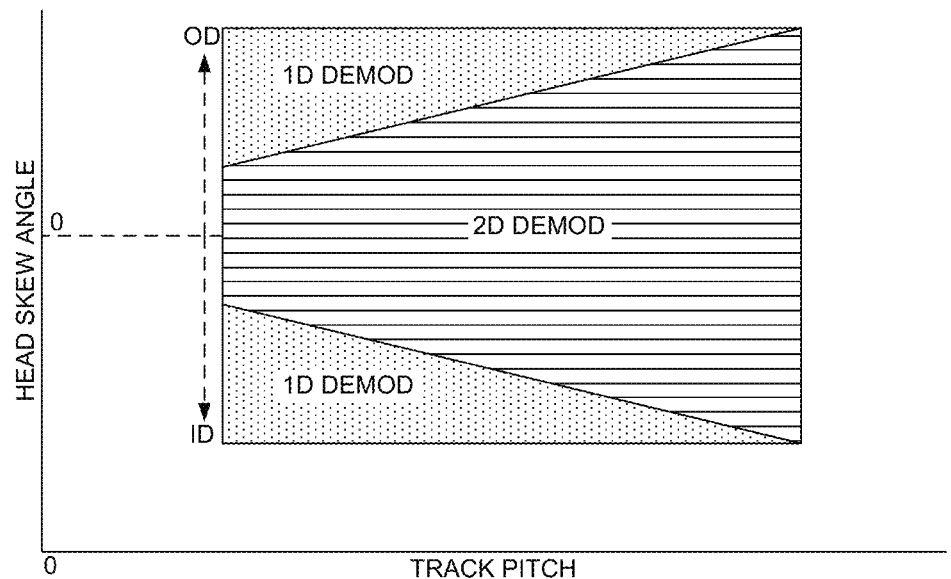
FIG. 5 illustrates the extent that the two-dimensional demodulation algorithm may be used to detect data recorded on the disk relative to the skew angle of the head and the track pitch of the data tracks according to an embodiment.

In an embodiment illustrated in FIG. 5, the number of data tracks spanned by the 2D bands depends on the track pitch (track width) of the data tracks (for a given configuration of the read elements). As the track pitch decreases leading to narrower data tracks, the width of the 2D bands decreases as shown in FIG. 5. Accordingly, in one embodiment the disk drive may be analyzed to determine an optimal track pitch that maximizes the capacity of each disk surface. That is, given the 2D bands enable a higher recording density than the 1D bands, there may be an optimal track pitch shown in FIG. 5 that optimizes the width of 2D and 1D bands to achieve the maximum capacity.

Figure 6:
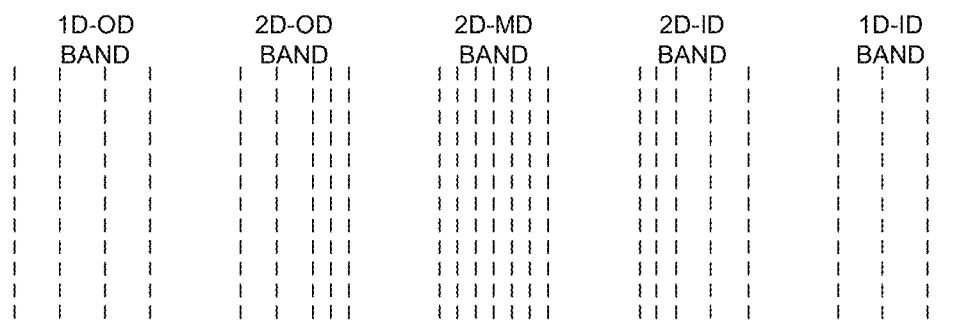
FIG. 6 illustrates an embodiment where the radial density of the data tracks is varied relative to the skew angle of the head and whether a one-dimensional or two-dimensional algorithm may be used to detect data recorded on the disk.

In one embodiment, the track pitch within the 2D bands may increase as the head nears each of the 1D bands. Referring to the example of FIG. 6, the 2D-MD BAND may comprise data tracks having the smallest track pitch, whereas the 2D-OD BAND and the 2D-ID BAND may comprise data tracks with a track pitch that increases toward the outer diameter and inner diameter of the disk, respectively. Increasing the track pitch toward the boundaries of the 2D bands may enable the 2D bands to span a greater number of data tracks, which may further optimizing the capacity of each disk surface. In the example of FIG. 6, the data tracks in the 1D bands comprise the largest track pitch since the one-dimensional demodulation algorithm does not compensate for ITI from an adjacent data track.

Figure 7A:
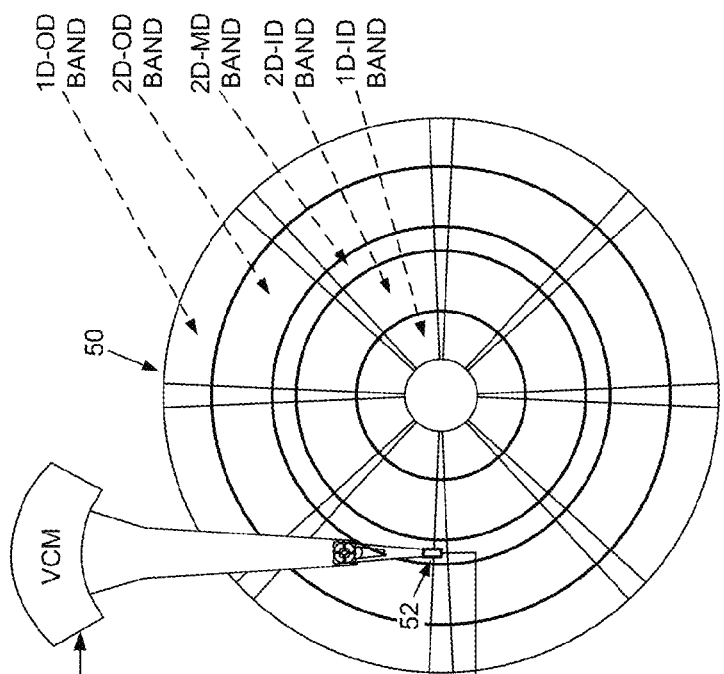
FIG. 7A shows a disk drive according to an embodiment comprising a disk having a plurality of tracks accessed using a one-dimensional or two-dimensional demodulation algorithm.
Figure 7B:
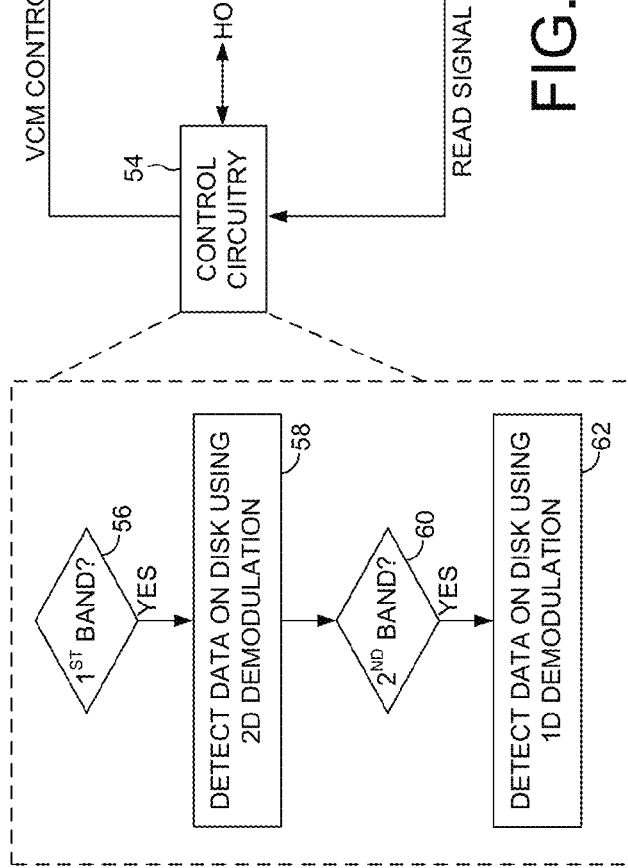
FIG. 7B is a flow diagram according to an embodiment wherein when the head is within a first radial band of the disk, data recorded on the disk is detected using a two-dimensional demodulation algorithm, and when the head is within a second radial band of the disk, data recorded on the disk is detected using a one-dimensional demodulation algorithm.

FIG. 7A shows a disk drive according to an embodiment comprising a disk 50 comprising a plurality of tracks, and a head 52 comprising at least two read elements (e.g., as shown in FIG. 2C). The disk drive further comprises control circuitry 54 configured to execute the flow diagram of FIG. 7B, wherein when the head is within a first radial band of the disk (block 56) such as the 2D-OD BAND, data recorded on the disk is detected by processing a first read signal generated by the first read element and by processing a second read signal generated by the second read element using a two-dimensional demodulation algorithm (block 58). When the head is within a second radial band of the disk different from the first radial band (block 60) such as the 1D-OD BAND, data recorded on the disk is detected by processing the first read signal using a one-dimensional demodulation algorithm (block 62).

Although the figures in the above embodiments show the read elements as having a width proximate the width of a data track, in an alternative embodiment one or more of the read elements may have a width that spans less than a full data track (e.g., eighty percent of a data track), and in other embodiments one or more of the read elements may have a width that spans more than a full data track. In one embodiment, the read elements of the head 20 may be fabricated with relative radial and/or down-track offsets that may be selected based on a target width for the data tracks (i.e., a target track pitch). In another embodiment, the relative radial and/or down-track offsets of the read elements may be measured by the control circuitry 24 executing a suitable calibration procedure, and then the target track pitch selected based on the measured offsets. In one embodiment, the target track pitch may also be selected based on the width of the write element, and in another embodiment the data tracks may be written in a shingled manner so that the target track pitch may be selected based on an amount of overlap of the shingled data tracks.

Figures 8A, 8B, 8C:
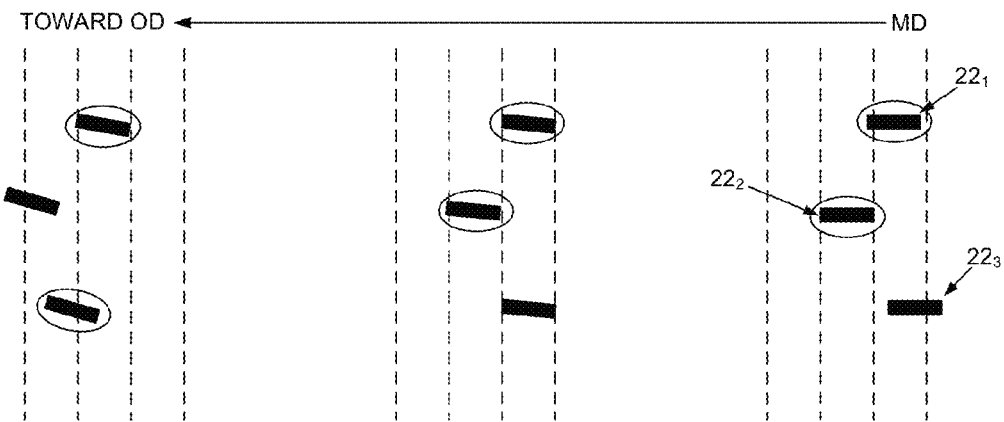
FIGS. 8A-8F show an embodiment where the first and third read elements may be fabricated with a relative radial offset (intentionally or due to manufacturing tolerances).
Figures 8D, 8E, 8F:
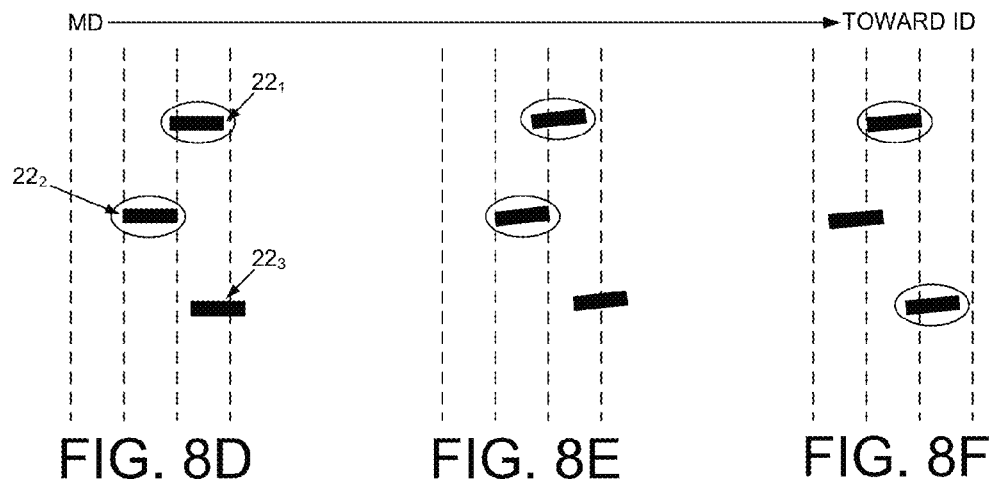

FIG. 2C shows an embodiment wherein the head 20 comprises three read elements fabricated with a particular configuration. However, other embodiments may employ a head 20 having more than three read elements fabricated in any suitable configuration and utilized in any suitable toggling sequence as the skew angle changes when the head 20 moves radially over the disk. FIGS. 8A-8F show an embodiment where the first and third read elements $22_1$ and $22_3$ may be fabricated with a relative radial offset (intentionally or due to manufacturing tolerances). In this embodiment, the first read element $22_1$ may be substantially aligned down-track with the third read element $22_3$ when the head 20 reaches a radial location of the disk 16 toward the OD as shown in FIG. 8B (as compared to near the ID as in the example of FIG. 2C). Also in one embodiment when the first and third read elements comprise a relative radial offset, the radial bands for employing either one-dimensional or two-dimensional demodulation may be asymmetric as compared to the symmetric example shown in FIG. 5.

In one embodiment, when data recorded on the disk is unrecoverable using a first two of the read elements, the control circuitry 24 may execute a retry operation using a different two of the read elements. Referring to the example of FIG. 3A, the control circuitry 24 may select read elements $22_2$ and $22_3$ when attempting to detect data in data track 44B during a first disk revolution, and if that fails, the control circuitry 24 may select read elements $22_1$ and $22_2$ to detect data during a retry revolution of the disk. In one embodiment, the control circuitry 24 may jog the read elements by a radial offset when selecting a different two of read elements for a retry operation. Referring to the example of FIG. 8A, if a read operation fails using read elements $22_1$ and $22_2$, during a retry revolution of the disk the control circuitry 24 may jog the read elements and then attempt to detect data in the same data track using a different two of read elements (e.g., read elements $22_1$ and $22_3$).

Figure 9:
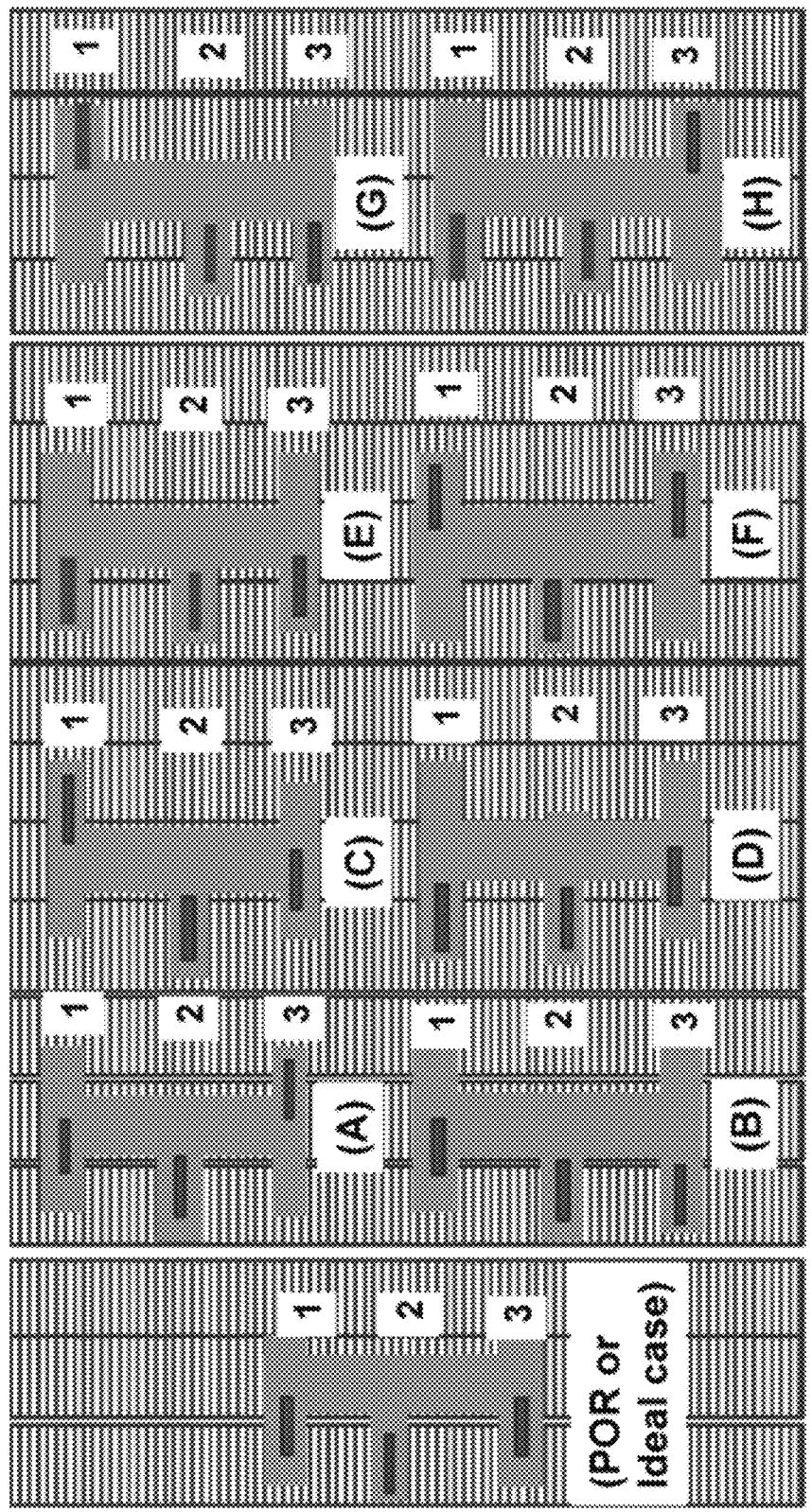
FIG. 9 shows various spacing configurations of three read elements as a result of fabrication tolerances according to an embodiment.

In one embodiment, the spacing between the read elements 22 (down-track and/or cross-track) may vary from head to head due to fabrication tolerances. FIG. 9 illustrates an embodiment wherein the spacing between three read elements may be measured and then categorized based on nine different spacing patterns. In other embodiments, each of the categories shown in FIG. 9 may be divided into further subcategories so as to provide even more matching options. As described above with reference to FIG. 11A, in one embodiment after measuring the spacing of the read elements for each head, the control circuitry 24 may configure the formatting of each disk surface by grouping the tracks into radial bands of one-dimensional (1D) and two-dimensional (2D) recording areas.

FIG. 10A illustrates an example of this embodiment wherein for the ideal spacing pattern, the tracks are grouped into a 2D band spanning a middle diameter of the disk, a 1D band spanning an inner diameter of the disk, and a 1D band spanning an outer diameter of the disk. For the "A" spacing pattern, in one embodiment the width of the 2D and 1D bands may be adjusted as shown in FIG. 10B. For the "F" spacing pattern, in one embodiment the tracks may be grouped into a 1D band spanning a middle diameter of the disk, a 2D band spanning an inner diameter of the disk, and a 2D band spanning an outer diameter of the disk (FIG. 10C). In one embodiment, the optimal grouping of the tracks into the 1D band(s) and 2D band(s) is determined by evaluating the performance of a subset of disk drives each having a different spacing pattern for the read elements. Once the optimal disk format has been determined for the different possible spacing patterns, a configuration table may be generated and loaded into each production disk drive. During a manufacturing procedure of each production disk drive, the control circuitry 24 may measure the spacing of the read elements within the head(s) 20 and then index the configuration table using the measured spacing in order to format the 1D band(s) and the 2D band(s) on the disk(s) 16.

The control circuitry 24 may employ any suitable technique to measure the spacing of the read elements in the head 20. In one embodiment, the down-track spacing between the read elements may be measured by measuring the relative time in detecting a radial coherent servo sync mark using each read element. That is, the read signal emanating from each read element may be processed separately using parallel sync mark detectors. A high frequency clock may then time a difference between when the servo sync mark is detected by each read element which may represent the relative down-track spacing between the read elements.

Figure 12:
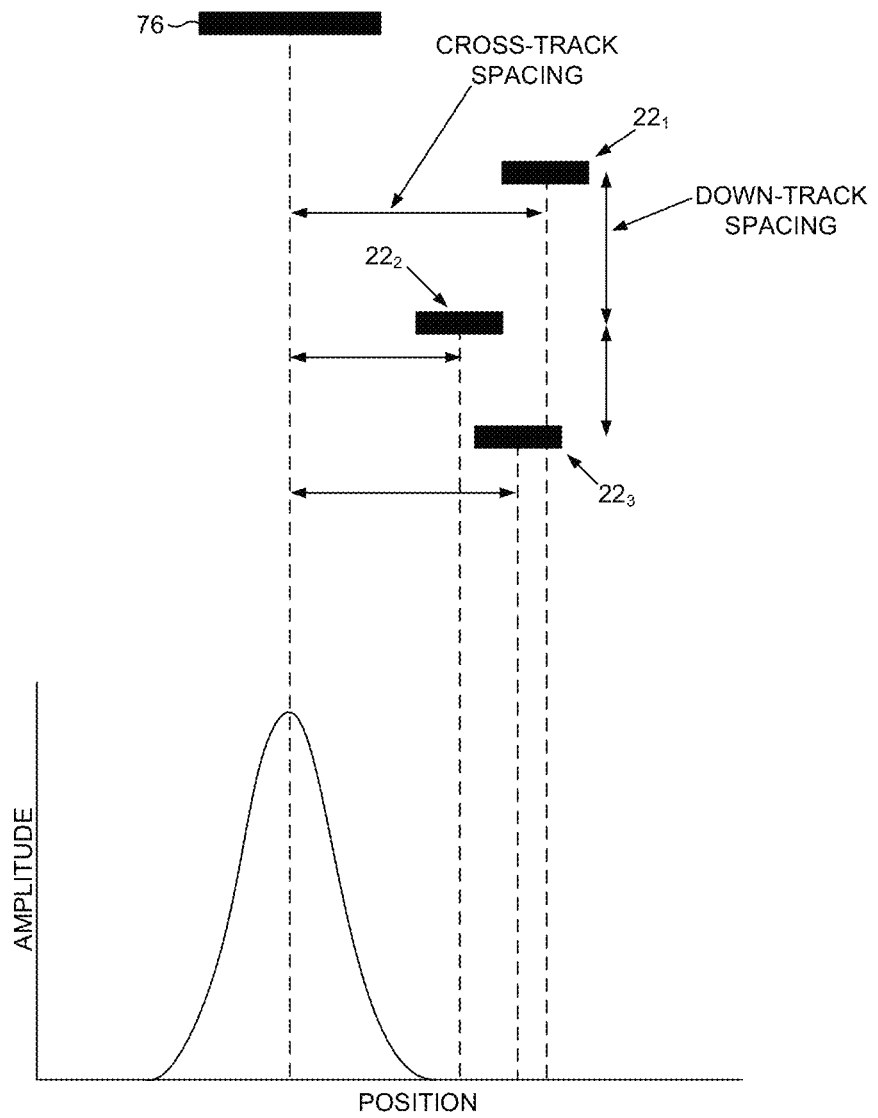
FIG. 12 shows an embodiment for measuring the cross-track spacing between three read elements.

The control circuitry 24 may also employ any suitable technique to measure the cross-track spacing of the read elements in the head 20. FIG. 12 illustrates an embodiment for measuring the cross-track spacing between three read elements $22_1$-$22_3$. While servoing the head 20 near a middle diameter of the disk based on reading servo information from the disk using at least one of the read elements $22_1$-$22_3$, a test pattern is written to the disk using a write element 76. The test pattern is then read from the disk using each read element while scanning the head 20 radially over the test pattern and generating an amplitude profile as shown in FIG. 12. The relative cross-track spacing between the read elements $22_1$-$22_3$ may be measured based on when the peak in the amplitude profile occurs for each read element as the head 20 is scanned radially over the test pattern starting from an initial position (as determined from the servo information).

In the embodiment described above with reference to FIG. 9, the head 20 may comprise three read elements wherein two of the three read elements may be selected for reading the 2D band(s) on the disk. In another embodiment, the head 20 may comprise as few as two read elements for reading the 1D band(s) and the 2D band(s) on the disk, wherein the down-track and/or cross-track spacing between the two read elements may be measured and used to format the disk. In yet another embodiment, the head 20 may comprise more than three read elements with corresponding different spacing patterns for formatting the disk.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk comprising a plurality of tracks;
   a head comprising at least two read elements including a first read element and a second read element; and
   control circuitry configured to:
      measure a spacing of the first and second read elements;
      based on the measured spacing, group the tracks into radial bands that define at least one one-dimensional recording area on the disk and at least one two-dimensional recording area on the disk;
      when the head is within a first two-dimensional recording area, detect data recorded on the disk by processing a first read signal generated by the first read element and by processing a second read signal generated by the second read element using a two-dimensional demodulation algorithm; and
      when the head is within a first one-dimensional recording area, detect data recorded on the disk by processing the first read signal using a one-dimensional demodulation algorithm.

2. The disk drive as recited in claim 1, wherein the control circuitry is further configured to group the tracks into radial bands that define at least two two-dimensional recording areas.

3. The disk drive as recited in claim 2, wherein the control circuitry is further configured to group the tracks into radial bands that define a one-dimensional recording area between the two two-dimensional recording areas.

4. The disk drive as recited in claim 1, wherein the spacing of the first and second read elements comprises a down-track spacing between the first and second read elements.

5. The disk drive as recited in claim 1, wherein the spacing of the first and second read elements comprises a cross-track spacing between the first and second read elements.

6. The disk drive as recited in claim 5, wherein when the head comprises a write element and the control circuitry is further configured to measure the cross-track spacing between the first and second read elements by:
   positioning the head near a middle diameter of the disk;
   servoing the head based on reading servo information from the disk using at least the first read element while writing a test pattern to the disk using the write element; and
   reading the test pattern from the disk using the first read element; and
   reading the test pattern from the disk using the second read element.

7. The disk drive as recited in claim 1, wherein the control circuitry is further configured to group the tracks into radial bands that define the at least one one-dimensional recording area on the disk and the at least one two-dimensional recording area on the disk by indexing a configuration table with the measured spacing.

8. The disk drive as recited in claim 1, wherein when the head comprises a third read element and the control circuitry is further configured to measure a spacing of the first, second, and third read elements.

9. A method of operating a disk drive, the method comprising:
   measuring a spacing of first and second read elements of a head;
   based on the measured spacing, grouping tracks on a disk into radial bands that define at least one one-dimensional recording area on the disk and at least one two-dimensional recording area on the disk;
   when the head is within a first two-dimensional recording area, detecting data recorded on the disk by processing a first read signal generated by the first read element and by processing a second read signal generated by the second read element using a two-dimensional demodulation algorithm; and
   when the head is within a first one-dimensional recording area, detecting data recorded on the disk by processing the first read signal using a one-dimensional demodulation algorithm.

10. The method as recited in claim 9, further comprising grouping the tracks into radial bands that define at least two two-dimensional recording areas.

11. The method as recited in claim 10, further comprising grouping the tracks into radial bands that define a one-dimensional recording area between the two two-dimensional recording areas.

12. The method as recited in claim 9, wherein the spacing of the first and second read elements comprises a down-track spacing between the first and second read elements.

13. The method as recited in claim 9, wherein the spacing of the first and second read elements comprises a cross-track spacing between the first and second read elements.

14. The method as recited in claim 13, further comprising measuring the cross-track spacing between the first and second read elements by:
   positioning the head near a middle diameter of the disk;
   servoing the head based on reading servo information from the disk using at least the first read element while writing a test pattern to the disk using the write element; and
   reading the test pattern from the disk using the first read element; and
   reading the test pattern from the disk using the second read element.

15. The method as recited in claim 9, further comprising grouping the tracks into radial bands that define the at least one one-dimensional recording area on the disk and the at least one two-dimensional recording area on the disk by indexing a configuration table with the measured spacing.

16. The method as recited in claim 9, further comprising measuring a spacing of the first read element, the second read element, and a third read element of the head.

* * * * *